United States Patent [19]

Reik

[11] Patent Number: 4,747,586
[45] Date of Patent: May 31, 1988

[54] FRICTION CLUTCH AND DIAPHRAGM SPRING THEREFOR

[75] Inventor: Wolfgang Reik, Bühl, Fed. Rep. of Germany

[73] Assignee: LuK Lamellen und Kupplungsbau GmbH, Bühl, Fed. Rep. of Germany

[21] Appl. No.: 54,148

[22] Filed: May 12, 1987

Related U.S. Application Data

[63] Continuation of Ser. No. 531,930, Sep. 13, 1983, abandoned.

[30] Foreign Application Priority Data

Sep. 15, 1982 [DE] Fed. Rep. of Germany ....... 3234212
Sep. 15, 1982 [DE] Fed. Rep. of Germany ....... 3234156

[51] Int. Cl.⁴ .............................................. F16F 1/34
[52] U.S. Cl. .................................. 267/161; 192/89 B
[58] Field of Search ................................ 267/161–163, 267/181, 158, 147; 192/89 B; 92/94

[56] References Cited

U.S. PATENT DOCUMENTS

| | | | |
|---|---|---|---|
| 1,535,803 | 4/1925 | Benjamin | 267/47 |
| 2,085,965 | 7/1937 | Forrest | 192/89 B |
| 3,155,366 | 11/1964 | Rasmussen | 92/94 X |
| 3,483,888 | 12/1969 | Wurzel | 267/161 X |
| 4,126,216 | 11/1978 | Babcock et al. | 192/89 B X |
| 4,300,669 | 11/1981 | Browne | 192/89 B |

*Primary Examiner*—William E. Wayner
*Attorney, Agent, or Firm*—Peter K. Kontler

[57] ABSTRACT

A diaphragm spring for use in friction clutches of motor vehicles has an annular main section and prongs which extend outwardly from the outermost part and/or inwardly from the innermost part of the main section. At least some of the prongs are reinforced by radially extending ribs each of which further extends radially across a portion of or across the entire main section. The ribs reduce the likelihood of breakage of the respective prongs in the regions where such prongs merge into the main section. Some outwardly extending prongs of the diaphragm spring are secured directly to the flywheel and the remaining outwardly extending prongs bear against a pressure plate of the friction clutch to urge a clutch disc against the adjacent side of the flywheel. The diaphragm spring replaces the clutch cover and defines an annular flexing zone where the inwardly extending prongs and the remaining outwardly extending prongs pivot when the clutch is to be disengaged by moving the remaining outwardly extending prongs away from the flywheel.

33 Claims, 4 Drawing Sheets

FRICTION CLUTCH AND DIAPHRAGM SPRING THEREFOR

This application is a continuation of application Ser. No. 531,930 filed Sept. 13, 1983, now abandoned.

BACKGROUND OF THE INVENTION

The present invention relates to diaphragm springs in general, and more particularly to improvements in diaphragm springs or Belleville springs of the type wherein an annular main section is integral with outwardly and/or inwardly extending prongs serving to transmit forces to or from the main section. For example, the prongs can serve to transmit to the main section forces which entail a change in the shape of the main section or to transmit stored energy from the main section to a neighboring component.

A diaphragm spring of the just outlined character is disclosed, for example, in German Auslegeschrift No. 1,475,437. The diaphragm spring which is described and shown in this German publication comprises an annular main section and an annulus of inwardly extending prongs constituting flexible tongues and surrounding a central opening. The neighboring tongues are separated from one another by radially extending slots each of which has a radially innermost portion of constant width and an intermediate portion whose width increases radially outwardly toward the main section. The deepmost portion of each slot is surrounded by a semicircular edge face of the main section. The intermediate portions of the slots are flanked by reinforced portions of the neighboring tongues. Such reinforced portions are formed by bending the material of the tongues from their general planes and in the axial direction of the diaphragm spring. The reinforcement which is achieved with the bent-over portions of the tongues is satisfactory insofar as the stiffening of the major portions of the tongues is concerned; however the reinforced portions cannot adequately reduce the extent of flexing of the radially outermost portions of the tongues in response to the application of axial stresses to their inner end portions for the purpose of changing the conicity of the diaphragm spring. This is due to the fact that the regions where the tongues are subjected to maximum bending stresses are not reinforced at all. Therefore, flexing of the outermost portions of the tongues is quite pronounced which is undesirable under many circumstances, e.g., when the diaphragm spring is used in a friction clutch wherein a release bearing must move through a considerable distance before the tongues are capable of changing the conicity of the main section. Moreover, such construction of the diaphragm spring often entails rapid destruction as a result of breakage of one or more tongues in the regions where their outer end portions merge into the main section. Breakage of tongues in the regions of merger into the main section is highly likely to take place whenever the diaphragm spring of the aforediscussed German publication is subjected to repeated dynamic stresses because of material fatigue as a result of repeated flexing at the innermost part of the main section. The reinforced portions of the tongues do not extend all the way around the innermost portions of the slots between the tongues so that the reinforcements merely stiffen the major part of each tongue inwardly of the region of merger into the main section. Breakage of tongues in a friction clutch, which is installed in a motor vehicle, can result in total destruction of such device with attendant pronounced danger of accidents when the clutch is out of commission.

It is true that the reinforced portions slightly reduce the extent to which the radially innermost portions of the tongues must be moved axially of the diaphragm spring in order to change the conicity of the main section. However, the difference between the extent of axial movement of innermost parts of the reinforced tongues and the extent of axial movement of innermost parts of non-reinforced tongues is small or negligible. As mentioned above, flexing of the outermost portions of tongues in the diaphragm spring of the German publication is still quite pronounced so that the release bearing must cover a considerable distance axially of the clutch before the conicity of the main section is changed sufficiently to disengage the clutch which embodies the diaphragm spring. This is highly undesirable in many types of motor vehicles wherein the space under the hood is at a premium and also on the ground that actuation (disengagement) of the clutch necessitates a longer interval of time.

German Pat. No. 756,351 discloses a friction clutch wherein the diaphragm spring can bias a pressure plate toward a flywheel to thereby establish a frictional torque transmitting engagement between the flywheel and a clutch disc which is placed between the flywheel and the pressure plate. This patent also discloses the possibility of securing the diaphragm spring to the flywheel and of providing the diaphragm spring with portions which bear against the pressure plate when the diaphragm spring is secured to the flywheel. The diaphragm spring of this patent has an annulus of tongues which extend radially inwardly from the annular main section of the diaphragm spring and can be engaged by a release bearing or the like to thereby effect a tilting of the diaphragm spring with attendant disengagement of the pressure plate from the clutch disc. The diaphragm spring is mounted between two ring-shaped seats which are provided on the cover of the clutch, and that portion of the diaphragm spring which bears upon the pressure plate is located radially outwardly of the seats. The cover is secured to the flywheel and transmits torque to the diaphragm spring whenever the flywheel is driven by the internal combustion engine a motor vehicle or the like. The diaphragm spring is installed in stressed condition so that it normally bears against the pressure plate and urges the latter against the clutch disc. Thus, the friction clutch of this German patent is normally engaged and is disengaged in response to axial shifting of a pressure transmitting element or a release bearing whereby such pressure transmitting element or release bearing acts upon the radially innermost portions of the tongues to pivot the diaphragm spring not unlike a two-armed lever whose fulcrum is defined by the two seats on the cover. This causes the portion of the diaphragm spring radially outwardly of the seats to pivot away from the pressure plate whereby the pressure plate releases the clutch disc which is then free to rotate independently of the flywheel and/or vice versa.

A somewhat different friction clutch is disclosed in French Pat. No. 1,281,320. In the clutch of this French patent, the diaphragm spring again acts not unlike a two-armed lever and serves to urge a pressure plate against a clutch disc so that the latter is held in requisite torque-receiving engagement with a flywheel or the like. However, the radially outermost portion of the diaphragm spring bears against the flywheel (i.e., against a component which is not designed to perform axial movements) and the pressure plate is movable axially of the flywheel together with the cover and the diaphragm spring. Axial shifting of the diaphragm spring (together with the pressure plate and the cover) with reference to the flywheel takes place when the clutch is to be disengaged so as to release the clutch disc which is installed between the pressure plate and the flywheel.

The friction clutch of the aforementioned German patent (especially the embodiment which is shown in FIGS. 1 and 2 of this patent) has been on the market for several decades and has found widespread acceptance in the automobile industry. However, the patented clutch still exhibits a number of drawbacks, especially as concerns the assembly of its parts, the cost of manufacturing the parts, the number of parts and the mode of operation.

OBJECTS AND SUMMARY OF THE INVENTION

An object of the invention is to provide a diaphragm spring wherein the prongs are much less likely to break at the locus of merger into the main section than in heretofore known diaphragm springs.

Another object of the invention is to provide a diaphragm spring wherein the prongs are less likely to break away from the annular main section than in heretofore known diaphragm springs irrespective of whether such prongs extend outwardly from the outermost part or inwardly from the innermost part of the main section.

A further object of the invention is to provide a diaphragm spring whose useful life is much longer than that of heretofore known diaphragm springs.

An additional object of the invention is to provide the diaphragm spring with novel means for enhancing the transmission of actuating forces to the main section and the transmission of stored energy from the main section to the part or parts which are biased by the diaphragm spring.

Still another object of the invention is to provide a dynamically stressed diaphragm spring wherein the path for transmission of forces to or from the main section is shorter than in conventional diaphragm springs.

An additional object of the invention is to provide a structure, such as a friction clutch for use in motor vehicles, which embodies the improved diaphragm spring.

Another object of the invention is to provide a novel and improved friction clutch which embodies a diaphragm spring of the above outlined character.

A further object of the invention is to provide a novel and improved method of reinforcing selected parts of a diaphragm spring.

An additional object of the invention is to provide a diaphragm spring which can replace a conventional diaphragm spring plus one or more additional parts of a conventional friction clutch for motor vehicles or the like.

Another object of the invention is to provide a friction clutch wherein the diaphragm spring can be directly secured to the flywheel.

An additional object of the invention is to provide a novel and improved friction clutch which need not employ a cover for the diaphragm spring.

A further object of the invention is to provide a friction clutch which is not only simpler and less expensive but also more compact than heretofore known friction clutches.

Another object of the invention is to provide a friction clutch wherein the number of parts is a fraction of the number of parts in conventional friction clutches.

A further object of the invention is to provide a friction clutch of the above outlined character which is more reliable and less prone to malfunction than heretofore known friction clutches.

Another object of the invention is to provide a friction clutch wherein the parts are subject to less pronounced wear than in conventional clutches.

An additional object of the invention is to provide a friction clutch which can be assembled of a surprisingly small number of prefabricated components within a fraction of the time that is needed for the assembly of heretofore known friction clutches.

An ancillary object of the invention is to provide novel and improved means for assembling the pressure plate and the diaphragm spring of the above outlined friction clutch into a prefabricated unit.

Another object of the invention is to provide a friction clutch whose weight can be a relatively small fraction of the weight of an equivalent conventional friction clutch.

A further object of the invention is to provide a novel pressure plate and a novel flywheel for use in or with a friction clutch of the above outlined character.

An additional object of the invention is to provide a friction clutch which, though ideally suited for use in many types of motor vehicles, is equally suited for use in a wide variety of other machines or apparatus wherein one or more driven parts must selectively receive torque from one or more driving parts.

One feature of the invention resides in the provision of a diaphragm spring or Belleville spring with radially innermost and outermost edge faces. The diaphragm spring comprises an annular main section with an innermost and an outermost part, a plurality of prongs which extend substantially radially (but not necessarily exactly radially) from at least one of the innermost and outermost parts of the main section, and substantially radially (but not necessarily exactly radially) extending reinforcing elements which are provided on at least some of the prongs and extend into the main section across at least one of the innermost and outermost parts of such section but terminate short of both edge faces of the spring. The reinforcing elements terminate short of the free end portions of the respective prongs. The arrangement may be such that the prongs extend radially inwardly from the innermost part of the main section and the reinforcing elements are integral with such inwardly extending prongs so that each reinforcing element extends between the free (inner) end portion of the respective prong and the outermost part of the main section. Alternatively, the prongs can extend outwardly from the outermost part of the main section and the reinforcing elements can be made integral with such prongs; each reinforcing element can extend toward but short of the innermost part of the main section. Still further, the prongs can include a first group extending inwardly from the innermost part of the main section and a second group extending outwardly from the outermost part of the main section. Each reinforcing element of such a diaphragm spring can extend across the entire main section but short of the free end portion of one prong of the first group as well as toward but short of the free end portion of one prong of the second group.

The thickness of at least one portion of each reinforcing element, as considered in the axial direction of the annular main section, can be less than the thickness of the non-reinforced portions of the diaphragm spring. The reinforcing elements can constitute corrugations of the main section and of the prongs, and the height of such corrugations, as considered in the axial direction of the main section, can vary in the radial direction of the main section. Alternatively, or in addition to the aforediscussed desirable characteristics of the improved diaphragm spring, each reinforcing element preferably extends from the one or the other main or major surface of the diaphragm spring and the extent to which at least some of the reinforcing elements project beyond the respective main or major surface or surfaces can decrease in a direction radially outwardly or inwardly of the main section. The outer or the inner end portions of such reinforcing elements can merge gradually into the main section of the diaphragm spring. Still further, the arrangement may be such that all or some of the reinforcing elements have first portions which extend axially of the spring from one of its major surfaces and second portions extending axially of the spring from the other major surface. Each such portion of a reinforcing element can be said to constitute a discrete reinforcing element, and each reinforcing element at one side of the spring can merge into a reinforcing element at the other side of the spring. The diaphragm spring can be formed with holes at the outer ends of some or all of the reinforcing elements.

In accordance with an additional feature of the invention, the diaphragm spring can comprise a first group of prongs which extend outwardly from the outermost part of the main section and a second group of prongs which also extend outwardly from the outermost part of the main section. In accordance with a presently preferred embodiment, m prongs of the first group alternate with a prongs of the second group, as considered in the circumferential direction of the main section (m and n are whole numbers including one). For example, discrete prongs of the first group can alternate with pairs of prongs of the second group. The main section preferably resembles or forms part of a first hollow conical frustum and the prongs of one of the two groups can constitute a second hollow conical frustum whose conicity is different from that of the first conical frustum.

The prongs can include arms which extend outwardly from the outermost part of the main section of the diaphragm spring. Such arms can constitute the one group and the prongs of the other group can constitute lugs which extend radially outwardly from the main section and alternate with the arms (e.g., discrete arms can alternate with pairs of lugs). The arms can merge into the main section radially inwardly of the free outer end portions of the adjacent lugs. The arms can constitute in their entirety a conical frustum whose conicity is different from that of the conical frustum which is constituted or formed in part by the main section of the diaphragm spring, and at least one of these conical frusta is flexible with reference to the other frustum in the region of merger of the arms into the main section. The reinforcing elements can constitute ribs which are provided on the lugs; e.g., each such rib can constitute an upset or otherwise deformed integral portion of the respective lug. The main section can be provided with slots which are inwardly adjacent to the arms, and the arms can include connecting portions which are outwardly adjacent to the slots and integral with the main section. Each connecting portion can constitute a torsion bar which allows for flexing of the arms with reference to the main section of the diaphragm spring and/or vice versa. As mentioned above, the arms can alternate with discrete lugs or with pairs of lugs, and each slot preferably extends circumferentially of the main section between the imaginary radial inward extensions of that pair of lugs which flank the respective arm. Each slot preferably extends beyond the respective arm, as considered in the circumferential direction of the main section. The reinforcing elements for the lugs can extend across the main section so that each slot is located between the ribs of those lugs which flank the respective arm.

The prongs which extend inwardly of the innermost part of the main section can constitute an annulus of tongues and preferably form part of a first hollow conical frustum which includes the main section. The arms constitute a second conical frustum whose conicity exceeds that of the first conical frustum.

The free outer end portions of the arms can constitute eyelets which facilitate attachment of the arms to a support, e.g., to the flywheel of a motor vehicle if the diaphragm spring forms part of a friction clutch. The width of each arm (as considered in the circumferential direction of the main section) can be constant all the way from the point where the arm merges into the outermost part of the main section to the outermost (free) end portion of the arm. Alternatively, the arms can taper outwardly from the outermost part of the main section.

When the diaphragm spring is installed in a friction clutch, certain portions of the arms are subject to greater bending stresses than the other portions, and the moment of resistance of each portion which is subject to greater bending stresses is preferably more pronounced than that of the remaining portion of the same arm.

Another feature of the invention resides in the provision of a structure which embodies the improved diaphragm spring, particularly a friction clutch for use in an automotive vehicle or the like. Such structure preferably comprises coaxial first and second components (e.g., a flywheel and a pressure plate which latter is movable axially of the flywheel), means for biasing one of the components (the pressure plate) toward the other component including the aforediscussed diaphragm spring, and fastener means for securing the arms of the diaphragm spring to the other component so that the one component is disposed between the main section of the diaphragm spring and the other component. A clutch disc is then interposed between the two components. The lugs of the diaphragm spring bear against the one component to yieldably urge the latter toward the other component whereby the clutch disc is clamped between such components and receives torque therefrom or transmits torque thereto. Such structure further comprises disengaging means (e.g., a release bearing) which serves to move the tips of the tongues of the diaphragm spring axially of the components and to thereby reduce the bias of the lugs upon the one component. Each tongue and an associated lug can constitute a two-armed lever having a fulcrum which is integral with the main section and the lever is pivotable about such fulcrum by the disengaging means to thereby move the respective lug axially of and away from the other component. The outer diameter of the annular friction lining on the clutch disc is preferably less than the diameter of the circle which is defined by the fastener means (e.g., an annulus of bolts or other discrete fasteners which secure the arms of the diaphragm spring to the other component). The lugs are prestressed when the arms are properly attached to the other component. The shanks of the bolts can extend through eyelets which preferably constitute the outermost portions of the arms. Each arm can further comprise a substantially V-shaped portion with two legs which diverge outwardly from the main section of the diaphragm spring. Each eyelet is integral with the other end portions of the two legs of the respective arm, i.e., such eyelet extends between the respective legs, as considered in the circumferential direction of the main section. Each eyelet can be formed with an extension which projects radially inwardly toward the axis of the main section and inwardly beyond the outer end portions of the respective pair of legs.

The arms are inclined with reference to the general plane of the main section of the diaphragm spring and are secured to the other component under an initial stress in such a way that their inclination with reference to the main section of the diaphragm spring increases in response to detachment of fastener means from the other component. In other words, the conicity of the hollow conical frustum which is formed by or includes the arms increases when the fastener means is detached from the other component because the arms then pivot their outermost portions radially inwardly to eliminate the initial stress.

The one component is preferably provided with marginal recesses through which the arms extend toward the other component. Such arms then extend along the periphery of the one component as well as along the periphery of the clutch disc between the two components. The one component can further comprise an annulus of projections which extend axially of the one component and alternate with the recesses. The lugs of the diaphragm spring bear against such projections.

Still further, the friction clutch (or another structure which embodies the improved diaphragm spring) can comprise coupling means (e.g., a set of leaf springs) for securing the diaphragm spring to the one component. Such leaf springs are yieldable in the axial direction of the two components but prevent rotation of the one component with reference to the other component and the diaphragm spring. The leaf springs can be connected to or made integral with the arms of the diaphragm spring, and they are further connected with radially outwardly extending protuberances of the one component. The protuberances are preferably adjacent to the aforementioned projections which extend axially of the two components are are engaged by the lugs of the diaphragm spring. If the leaf springs are articulately connected to the outermost portions (such as the aforementioned eyelets) of the arms, the means for articulately connecting can include the discrete fasteners which secure the arms to the other component. Each leaf spring can constitute a two-armed leaf spring having a median portion which is integrally or separably connected to an arm. The arms of such leaf springs are bolted or otherwise secured to the one component and extend from the median portion in the opposite directions as considered circumferentially of the main section of the diaphragm spring. If each leaf spring constitues a simple link, one of its end portions is secured to or made integral with an arm and its other end portion is attached to the one component. The arrangement is preferably such that pairs of links are connected to the one component by discrete bolts, screws or other types of securing means. The leaf springs preferably maintain the arms in prestressed condition so that the openings of eyelets at the outer ends of such arms register with openings in the other component. Registering openings of the arms and of the other component receive shanks of bolts, screws or other discrete fasteners which secure the arms to the other component. The diaphragm spring, the one component and the leaf springs of the coupling means preferably constitute a preassembled unit which can be secured to the other component by the aforementioned fastener means.

An additional feature of the invention resides in the provision of a structure which can constitute a friction clutch for use in motor vehicles and comprises coaxial first and second rotary components, a diaphragm spring including an annular main section, a plurality of first prongs extending outwardly from the main section and a plurality of second prongs also extending outwardly from the main section, and fastener means securing the first prongs to one of the two components to thereby bias the second prongs against the other component in a direction toward the one component.

Still another feature of the invention resides in the provision of a friction clutch, particularly for use in motor vehicles. The clutch comprises coaxial first and second rotary components at least one of which is movable axially with reference to the other component, and the diaphragm spring including an annular main section, a retaining portion affixed to the other component, a plurality of first prongs (e.g., in the form of relatively short lugs extending outwardly from the main section and arranged to bear against the one component so as to urge the latter toward the other component, a plurality of second prongs (e.g., in the form of elongated tongues or fingers) extending inwardly from the main section, and an unsupported annular flexing zone disposed between the first and second prongs and constituting a fulcrum for the first and second prongs. The second prongs are pivotable (e.g., by a release bearing) with reference to the fulcrum to thereby pivot the first prongs in the same direction. Each second prong and a discrete first prong can be said to constitute or resemble a two-armed lever which is fulcrumed in the flexing zone and pivots in response to depression of the tips of second prongs or in response to exertion of a pull upon the tips of the second prongs. The one component can comprise a first pressure plate and the other component can comprise a second pressure plate, and such friction clutch preferably further comprises a third rotary component in the form of a clutch disc which is coaxial with and is disposed between the pressure plates. The second pressure plate can constitute a flywheel which is rotated by the crankshaft of the engine in a motor vehicle.

The retaining portion preferably comprises an annulus of arms which surround the main section of the diaphragm spring. Each arm is preferably rigid, as considered in the axial direction of the diaphragm spring, and each arm is preferably integral with the main section. To this end, the diaphragm spring comprises intermediate portions each of which is disposed between an arm and the adjacent portion of the main section. The main section and the first and second prongs form part of or constitute a first conical frustum, and the arms form part of or constitute a second conical frustum whose conicity is more pronounced than that of the first conical frustum. The conicity of the first conical frustum is variable by pivoting the second prongs and the main section with reference to the arms in the region of the intermediate portions of the diaphragm spring. The diameter of the aforementioned annular flexing zone equals or approximates the diameter of the annulus which is formed by the intermediate portions of the diaphragm spring.

At least a portion of each arm preferably extends radially outwardly beyond the main section, and each arm is preferably elongated and includes a longitudinally extending reinforcing portion or element.

The first prongs of the diaphragm spring are disposed radially outwardly of the annulus of intermediate portions. The arms can be secured to the other component of the friction clutch by discrete fasteners in the form of threaded bolts, screws, rivets or the like. The arms are preferably secured to the other component in stressed condition so that the first prongs automatically bear against the one component when the arms are properly secured to the other component. The arms preferably alternate with the first prongs, as considered in the circumferential direction of the main section of the diaphragm spring. In a presently preferred embodiment of the friction clutch, pairs of first prongs alternate with discrete arms.

The main section can be provided with an annulus of windows to enhance the flexibility of the diaphragm spring in the aforementioned flexing zone, and a discrete window is preferably disposed radially inwardly of each arm of the retaining portion of the diaphragm spring. Each intermediate portion is disposed in the region of one or more windows, and each such intermediate portion connects a discrete arm with the main section. The windows can include or constitute slots which extend in the circumferential direction of the main section. The arrangement is preferably such that each window extends clockwise as well as counterclockwise beyond the respective arm, as considered in the circumferential direction of the main section. Each window is preferably disposed between a pair of first prongs, as considered in the circumferential direction of the main section, and each window preferably extends circumferentially of the main section substantially between the imaginary inward extensions of the respective pair of first prongs.

Each arm can include a looped portion which merges into the main section, and the radially outermost portion of each arm (namely, the portion which is remotest from the main section) can be provided with an eyelet which is adjacent to the other component. Each fastener extends through one of the eyelets and into a tapped bore of the other component (if the fasteners are threaded bolts or screws). The width of each arm can be at least substantially constant, as considered in the circumferential direction of the main section. Alternatively each arm can taper radially outwardly of and away from the main section. The construction and configuration of the arms is preferably such that those portions of the arms which are subjected to more pronounced bending moments exhibit greater moments of resistance than the remaining portions of the arms. To this end, each arm can comprise a relatively wide first portion which is integral with the main section, a relatively wide second section which is secured to the other component of the friction clutch, and a relatively narrow intermediate portion (such intermediate portion can consist of two relatively narrow elongated legs resembling a letter V and diverging radially outwardly and away from the main section). The aforementioned second portions of the arms can constitute the eyelets which preferably extend between the outermost portions of the respective pairs of legs, as considered in the circumferential direction of the main section. Such eyelets can comprise extensions which extend radially inwardly, preferably beyond the radially outermost portions of the respective pairs of legs. The fasteners preferably secure the eyelets to the other component in prestressed condition, namely, in such a way that, when the fasteners are removed, the extensions of the eyelets preferably make acute angles with the plane of that surface of the other component which faces toward the diaphragm spring. Such acute angles are reduced to zero when the eyelets are properly secured to the other component by flexing the arms about the respective portions of the fulcrum which is defined by the intermediate portions of the diaphragm spring. The diameter of the annulus of holes in the eyelets of the arms is larger than the diameter of the annulus of bores in the other component of the diaphragm spring when the fasteners are removed, i.e., when the arms are not secured to the other component.

The one component of the diaphragm spring is preferably provided with an annulus of axially parallel projections which alternate with radially inwardly extending recesses for the arms of the retaining portion of the diaphragm spring. The arms extend through such recesses, axially along the periphery of the clutch disc and toward engagement with the other component. Each projection abuts against one of the first prongs when the diaphragm spring is properly secured to the other component.

The friction clutch preferably further comprises axially yieldable coupling means which secures the one component for rotation with the diaphragm spring but with freedom of axial movement relative to the other component. Such coupling means preferably comprises a set of leaf springs. The leaf springs can be used to secure the arms of the retaining portion of the diaphragm spring to the one component of the friction clutch. The one component can be provided with radially outwardly extending protuberances which alternate with the arms, as considered in the circumferential direction of the main section, and such protuberances are then connected with the leaf springs. For example, the leaf springs can be connected to or made integral with the eyelets or with other portions of the respective arms or with other portions of the diaphragm spring. The coupling means can comprise a pair of discrete or interconnected leaf springs for each arm; one leaf spirng of each pair then extends clockwise from the respective arm and the other leaf spring of each pair then extends counterclockwise from the respective arm, as considered in the circumferential direction of the main section of the diaphragm spring. Each leaf spring of each pair of such springs is further connected to the one component of the friction clutch. Rivets or other types of fasteners can be provided to secure the leaf springs to the one component. For example, each such rivet can be disposed between two neighboring arms and can be connected with one leaf spirng of a pair of leaf springs which are secured to one of such arm and to one leaf spring of a pair of such leaf springs which are connected to the other arm of the just mentioned pair of neighboring arms. It is also possible to employ two-armed leaf springs each of which has a central portion secured to or made integral with an arm and two outer end portions secured to the one component. Alternatively, the median portion of each two-armed leaf spring can be secured to the one component and the free end portions of such two-armed leaf springs are then secured to or made integral with the neighboring arms. The leaf springs are preferably designed to maintain the arms of the retaining portion of the diaphragm spring in radially stressed condition. Thus, the leaf springs can be employed as a means to impart to the annulus of arms a predetermined diameter such as is necessary to ensure that the opening of each eyelet register with a bore of the other component when the diaphram spring is to be secured to the other component. Also, the leaf springs are preferably stressed in the axial direction of the diaphragm spring when they are properly secured to the arms and to the one component. This ensures that the leaf springs can urge the one component axially and away from the clutch disc so that the latter ceases to rotate with the other component when the clutch is disengaged by moving the tips of the second prongs in the axial direction of the two components.

The leaf springs can be used as a means for assembling the diaphragm spring and the one component into a prefabricated unit which can be readily secured to or disconnected from the other component because the diameter of the annulus of openings in the eyelets of the arms is then the same as the diameter of the annulus of bores in the other component.

The second prongs can be provided with ribs or analogous reinforcing elements. Such reinforcing elements can extend into the main section of the diaphragm spring and, if necessary, across the main section and into the registering first prongs. However, the reinforcing elements preferably terminate short of the innermost and/or outermost edge face of the diaphragm spring, i.e., short of the innermost portions of the second prongs and short of the outermost portions of the first prongs.

The novel features which are considered as characteristic of the invention are set forth in particular in the appended claims. The improved diaphragm spring and friction clutch themselves, however, both as to their construction and the mode of using and assembling the same, together with additional features and advantages thereof, will be best understood upon perusal of the following detailed description of certain specific embodiments with reference to the accompanying drawing.

BRIEF DESCRIPTION OF THE DRAWING

FIG. 1a is a fragmentary plan view of a diaphragm spring which embodies one form of the invention and has a set of prongs extending outwardly from the outermost part of the main section and a set of prongs extending inwardly from the innermost part of the main section;

FIG. 1b is a fragmentary plan view of a second diaphragm spring with modified reinforcing elements for the two sets of prongs;

FIG. 1c is a similar fragmentary plan view of a third diaphragm spring with a single set of prongs which extend inwardly from the innermost part of the main section;

FIG. 1d is a fragmentary plan view of a fourth diaphragm spring with a single set of prongs which extend outwardly from the main section;

FIG. 2 is a sectional view as seen in the direction of arrows from the line II—II of FIG. 1a;

FIG. 3 is a sectional view as seen in the direction of arrows from the line III—III of FIG. 1b;

DESCRIPTION OF THE PREFERRED EMBODIMENTS

Figures 1A, 1B, 1C, 1D, 2, 3:
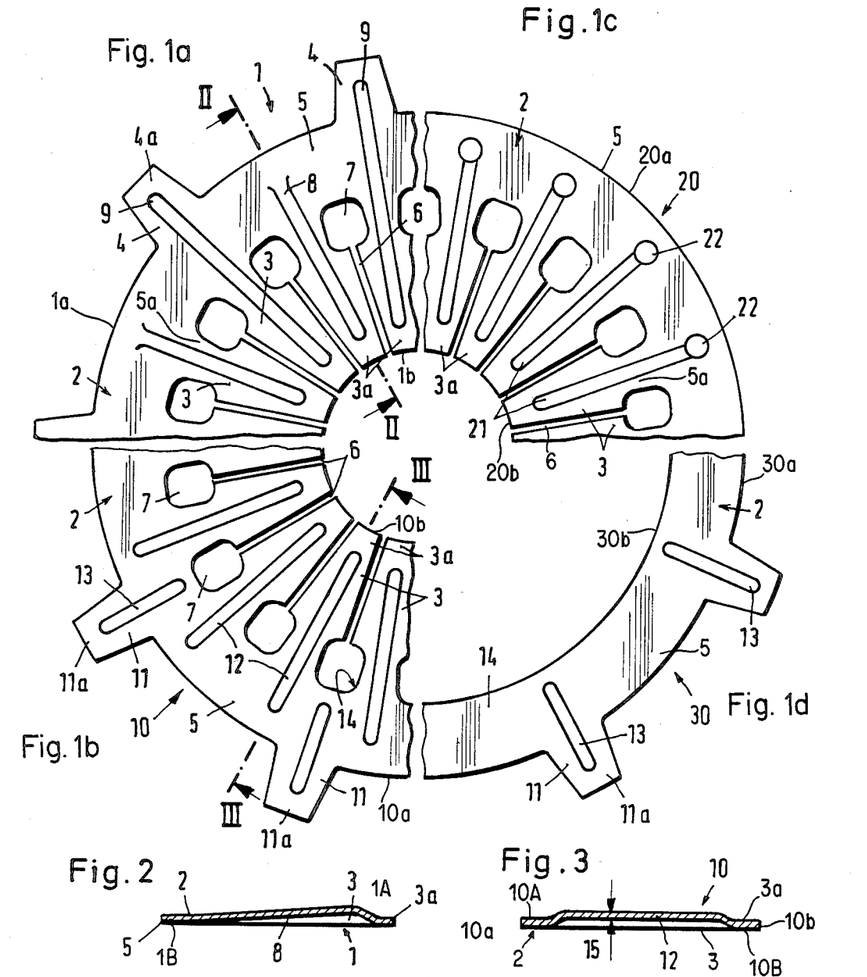

Referring first to FIG. 1a there is shown a portion of a diaphragm spring or Belleville spring 1 having an annular main section 2 and prongs 3, 4. The relatively long prongs 3 constitute tongues which extend radially inwardly from the innermost part 5a of the main section 2, and the relatively short prongs 4 constitute lugs which extend radially outwardly from the outermost part 5 of the main section 2. The prongs 3 are separated from one another by radially extending, slots 6 of constant width except at their radially outermost ends which constitute relatively large openings 7 for the passage of shanks of rivets or like fasteners serving to secure the diaphragm spring 1 to the cover of a friction clutch, e.g., a friction clutch of the type disclosed in commonly owned U.S. Pat. No. 4,368,810. Each second tongue 3 is in register with a discrete lug 4, as considered in the radial direction of the diaphragm spring 1.

In accordance with a feature of the invention, the diaphragm spring 1 further comprises reinforcing elements 8 for those tongues 3 which do not register with lugs 4 and reinforcing elements 9 for the tongues 3 which do register with lugs 4. The relatively short reinforcing elements 8 are elongated ribs which extend toward but short of the free inner end portions or tips 3a of the respective tongues 3, and each such reinforcing element extends across the innermost part 5a of the main section 2 toward but short of the outermost part 5. The relatively long reinforcing elements 9 are straight radially extending ribs each of which extends toward but short of the tip 3a of the respective tongue 3 and toward but short of the outer end portion or tip 4a of the respective lug 4. Thus, each reinforcing element 9 extends across the entire main section 2 including its outermost and innermost parts 5 and 5a. However, none of the reinforcing elements 8, 9 extend all the way to the outermost edge face 1a and/or to the innermost edge face 1b of the diaphragm spring 1.

The provision of reinforcing ribs 8 and 9 enhances the ability of the tongues 3 and lugs 4 to resist flexure in the regions where they merge into the respective (innermost and outermost) parts 5a and 5 of the main section 2. Moreover, such reinforcing elements reduce the extent to which the lugs 4 and/or the tongues 3 can be flexed or need be flexed relative to the main section 2 before they effect a change in the conicity of the main section. The tips 3a of the tongues 3 can be depressed by a disengaging device (such as a conventional release bearing) which moves the tips 3a axially of the diaphragm spring 1 in order to disengage the lugs 4a from the adjacent pressure plate of a friction clutch in a manner which is well known from the art of friction clutches. The lugs 4 serve to transmit stored energy from the main section 2 to the pressure plate of the clutch in order to urge the pressure plate against a clutch disc which can be installed between the pressure plate and the flywheel of a motor vehicle.

FIG. 2 shows that the reinforcing elements 8 can constitute integral parts of the respective tongues 3, namely, corrugations which are obtained by deforming centrally located elongated portions of the respective tongues so that they extend from one of the two major or main surfaces 1A, 1B of the diaphragm spring 1. The extent to which the rib-like reinforcing element 8 of FIG. 2 projects from the major surface 1A varies in a direction from the tip 3a toward the outermost part 5 of the main section 2 of the diaphragm spring 1, i.e., the extent decreases gradually and the outermost part of the reinforcing element 8 merges gradually into the material of the main section 2 short of the outermost part 5. It can be said that each reinforcing element 8 resembles a wedge which tapers from the respective tip 3a toward the outermost part 5 of the main section 2.

The configuration of longer reinforcing elements 9 can be similar to that of the reinforcing elements 8. Alternatively, each reinforcing element 9 can taper from each of its ends toward the median portion, i.e., from the tip 4a of the respective lug 4 toward the center of the main section 2 and also from the tip 3a of the respective tongue 3 toward the center of the main section 2.

An important advantage of the improved diaphragm spring 1 is that the prongs including the tongues 3 and the lugs 4 are reinforced not only inwardly or outwardly of the locations of their merger into the main section 2 but also at such locations. Since each of the reinforcing elements 9 extends into the main section 2, the moments of resistance of the tongues 3 and lugs 4 to bending are much more pronounced than if the reinforcing elements were to terminate short of the main section. It has been found that the reinforcing elements 9 contribute significantly to longer useful life of the diaphragm spring 1 because they greatly reduce the likelihood of breakage of the tongues 3 and/or lugs 4 in the regions of their merger into the main section 2. This applies irrespective of whether the tongues 3 and/or lugs 4 are subjected to frequent, regularly recurring, irregularly recurring or infrequent bending stresses.

It has also been found that stiffening of the prongs in the aforedescribed manner not only reduces the likelihood of breakage of prongs in the regions of their merger into the main section 2 but that the reinforcing elements 8 and 9 also contribute to longer useful life of the main section, i.e., of the energy storing part (actual Belleville spring) of the improved diaphragm spring, even if the diaphragm spring 1 is subjected to frequently recurring dynamic stresses of the type arising, for example, when the diaphragm spring is used in a friction clutch for automotive vehicles to bias a pressure plate against a clutch disc whose friction lining is thereby urged into frictional engagement with a flywheel or with another part receiving torque from the engine. The reason for longer useful life of the main section 2 (as a result of the provision of reinforcing elements 8 and/or 9) is believed to be that the reinforcing elements, which extend radially across a portion of or across the entire main section 2, enhance the flexibility of the main section as considered in the circumferential direction of the diaphragm spring. In other words, those portions of the reinforcing elements 8 and 9 which extend across the main section 2 define pivot axes to enhance the flexibility of the respective portions of the main section 2 so that the stresses to which the main section is subjected when the diaphragm spring is installed (in prestressed condition) in a friction clutch or the like are uniformly distributed all the way around the main section. Thus, the reinforcing elements reduce the likelihood of development of peak stresses in certain discrete portions of the main section 2.

An advantage of the reinforcing elements 9 is that they extend across the entire main section 2 so that they enhance the flexibility of the main section all the way from the innermost part 5a to the outermost part 5. This ensures an even more uniform distribution of stresses all the way around the main section 2 because each reinforcing element 9 can be said to perform the function of a pintle which allows for mutual flexing of the portions of main section 2 at the opposite sides of such reinforcing element. In other words, the reinforcing elements 9 reduce the likelihood of concentration of highly localized and pronounced stresses in the outermost part 5 as well as in the innermost part 5a of the main section 2.

The utilization of reinforcing elements whose thickness varies, as considered in the radial direction of the main section, can also contribute to longer useful life of the diaphragm spring. Thus, the thickness of the reinforcing elements can be reduced in those portions of the main section 2 which are most likely to develop pronounced localized stresses, particularly in the radially outermost part 5 of the main section. Therefore, the feature which is shown in FIG. 2 can be resorted to in order to greatly reduce the possibility of development of peak stresses close to or in the outermost part 5 by the simple expedient of gradually reducing the thickness of the reinforcing elements 8 in a direction from the tips 3a of the respective tongues 3 toward the outermost part 5 of the main section 2. The direction in which the thicknesses of some or all of the reinforcing elements decrease will be selected in dependency on a number of parameters, for example, in dependency upon the nature of mounting the diaphragm spring in a friction clutch or the like. The nature of mounting determines the location where the peak stresses are likely to develop when the diaphragm spring is subjected to dynamic and/or other stresses. In other words, by selecting the direction in and the extent to which the reinforcing elements merge into the main portion of the improved diaphragm spring, one can determine the ability of the main section 2 to distribute localized stresses all the way around its circumference, either close to the innermost part 5a, close to the outermost part 5, or at any selected radial distance from the part 5 or 5a.

By having the reinforcing elements 8 merge gradually into the main section 2 toward the outermost part 5 of such main section, one ensures that the characteristics of the outermost part 5 are not influenced (or are influenced only negligibly) by the reinforcing elements 8 whereas these reinforcing elements exert a much more pronounced influence upon the flexibility of the radially innermost part 5a.

The diaphragm spring 10, a portion of which is shown in FIG. 1b, comprises an annular main section 2, an annulus of prongs 11 in the form of relatively short lugs which extend outwardly from the outermost part 5 of the main section 2, and an annulus of relatively long prongs 3 in the form of tongues which extend inwardly from the innermost part 14 of the main section 2. The tongues 3 are separated from each other by radially extending slots 6 having enlarged outer end portions 7 at the innermost part 14 of the main section 2. The number of tongues 3 is twice the number of lugs 11, and each lug 11 is in register with one of the enlarged outer end portions 7 rather than with one of the tongues 3. In other words, each second slot 6 is in line with one of the lugs 11.

The diaphragm spring 10 further comprises reinforcing elements in the form of relatively short radially extending straight ribs 13 which are provided on or in the lugs 11 and extend across the outermost part 5 toward but short of the innermost part 14 of the main section 2, and relatively long radially extending reinforcing elements 12 in the form of straight ribs which are provided in or on the tongues 3 and extend across the innermost part 14 toward but short of the outermost part 5 of the main section 2. The free outer end portions or tips 11a of the lugs 11 are not reinforced, and the same holds true for the free inner end portions or tips 3a of the tongues 3. None of the reinforcing elements 12 and/or 13 extend all the way to the outermost edge face 10a and/or to the innermost edge face 1b of the diaphragm spring 10. Moreover, none of the shorter reinforcing elements 13 extend all the way to the enlarged outer end portions 7 of the respective (aligned) slots 6.

FIG. 3 shows that the extent to which the relatively long reinforcing elements 12 project from the major surface 10A of the diaphragm spring 10 is constant all the way from the innermost to the outermost portions of such reinforcing elements. Furthermore, the thickness (15) of the reinforcing elements 12 (as measured in the axial direction of the diaphragm spring 10) can be less than the thickness of the remaining portion (including the main section 2) of the diaphragm spring. The configuration of the relatively short reinforcing elements 13 is or can be similar to that of the reinforcing elements 12, i.e., each reinforcing element 13 can extend beyond the major surface 1A or 1B of the diaphragm spring 10 to the same extent all the way from its innermost to its outermost part and the thickness of each reinforcing element 13 can be less than that of the main section 2.

Though none of the reinforcing elements 12 and 13 extend all the way across the entire main section 2, such reinforcing elements nevertheless reduce the likelihood of development of highly localized stresses in any portion of the main section 2 because the reinforcing elements 12 allow for flexing of the inner half of the main section 2 and the reinforcing elements 13 allow for flexing of the outer half of the main section.

The feature which is shown in FIG. 3, namely, that some or all of the prongs of the improved diaphragm spring are thinner than the remaining portion or portions of the diaphragm spring, also contributes to prevention of localized stressing of the main section 2. Such relatively thin reinforcing elements have been found to contribute sufficiently to stiffening of the respective prongs so that they cannot flex excessively in the regions of their merger into the main section 2. On the other hand, the relatively thin reinforcing elements 12 and/or 13 enhance the flexibility of the corresponding portions of the main section 2 about radially extending axes to thus greatly reduce the likelihood of premature destruction of the main section as a result of the development of localized stresses. The provision of relatively thin reinforcing elements which extend partially or entirely across the main section has been found to result in a highly pronounced reduction of the aforediscussed localized stresses.

The features of FIGS. 2 and 3 can be combined in one and the same diaphragm spring, i.e., the thickness of some or all of the reinforcing elements can be less than the thickness of the remaining portions of the diaphragm spring and the reinforcing elements can taper in the radial direction so that they merge gradually into the respective prongs and/or into the main section. If the reinforcing elements 13 of FIG. 1b are to taper in a manner which is similar to that shown in FIG. 2, they preferably taper radially inwardly so that they merge into the main section 2 somewhere radially outwardly of the corresponding region of the innermost part 14. This ensures that the outermost part 5 is more flexible (about radial axes defined by the reinforcing elements 9) than the innermost part 14 which latter is more or less unaffected by the provision of reinforcing elements 9 (insofar as its ability to flex about radially extending axes is concerned).

FIG. 1c illustrates a portion of a third diaphragm spring 20 having an annular main section 2 and an annulus of prongs in the form of elongated tongues 3 which extend inwardly from the innermost part 5a of the main section 2. The slots 6 between the neighboring tongues 3 are configurated in the same way as those shown in FIG. 1a or 1b. Each tongue 3 is provided with an elongated straight radially extending reinforcing element 21 in the form of an integral rib which extends toward but short of the respective tip 3a and toward but short of the outermost part 5 of the main section 2. It will be noted that each reinforcing element 21 extends across the radially innermost part 5a of the main section 2 and also that none of the reinforcing elements 21 extend all the way to the outermost edge face 20a or to the innermost edge face 20b of the diaphragm spring 20. The main section 2 is formed with an annulus of circular holes 22 which are adjacent to the outermost portions of the reinforcing elements 21 and are spaced apart from the outermost edge face 20a of the diaphragm spring 20.

The provision of holes 22 at the outer ends of the reinforcing elements 21 contributes to a reduction of stresses in the main section 2. Such holes are particularly desirable and advantageous at those ends of the reinforcing elements which terminate in the main section. The reduction of stresses which is attributable to the provision of holes 22 is compounded with the reduction which is attributable to the provision of reinforcing elements that extend radially of the main section 2 and/or to the making of reinforcing elements which are thinner than the main section.

The diaphragm spring 30 of FIG. 1d comprises an annular main section 2 and an annulus of prongs in the form of lugs 11 which extend outwardly from the outermost part 5 of the main section 2. The radially extending reinforcing elements 13 are ribs which are provided on the lugs 11 and extend radially outwardly toward but short of the tips 11a of the respective lugs and radially inwardly across the outermost part 5 but short of the innermost part 14 of the main section 2. Again, none of the reinforcing elements 13 extend all the way to the outer edge face 30a or to the inner edge face 30b of the diaphragm spring 30.

All reinforcing elements of a particular diaphragm spring need not be provided at one and the same side of the respective spring. For example, some of the reinforcing elements can extend from one major surface and the remaining reinforcing elements can extend from the other major surface of the respective diaphragm spring. With reference to FIG. 1a, the reinforcing elements 8 can extend from the major surface 1A (as shown in FIG. 2) of the diaphragm spring 1, and the reinforcing elements 9 can extend from the major surface 1B. The same holds true for the reinforcing elements 12 and 13 of FIG. 1b (as shown in FIG. 3, the reinforcing elements 12 can extend from the major surface 10A; the reinforcing elements 13 can extend from the other major surface 10B). It is further possible to have some of the reinforcing elements 12 extend from the major surface 10A and to have the remaining reinforcing elements 12 extend from the major surface 10B. As a rule, and for the convenience of making them, all similar or identical reinforcing elements will extend from one and the same major surface of the respective diaphragm spring. The presently preferred mode of making the reinforcing elements is to deform portions of the respective prongs and of the main section so that the making of each such reinforcing element results in the formation of a depression at the opposite side of the diaphragm spring.

Figure 4:
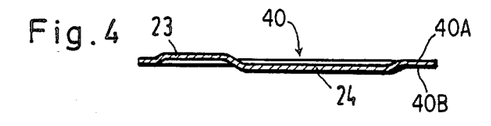
FIG. 4 is a sectional view of a fifth diaphragm spring.

FIG. 4 shows that each reinforcing element can have a first portion 23 extending from one major surface 40A and a second portion 24 extending from the other major surface 40B of the diaphragm spring 40. The innermost part of the portion 23 preferably merges into the outermost part of the portion 24 in the general plane of the diaphragm spring 40. Each of the portions 23, 24 can be said to constitute a discrete reinforcing element, i.e., the reinforcing elements or portions 23 are disposed at one side and the reinforcing elements or portions 24 are disposed at the other side of the diaphragm spring 40. The extent to which the portions or elements 23 extend from the major surface 40A may but need not be the same as the extent to which the portions or elements 24 project from the major surface 40B.

The portions or elements 23 of FIG. 4 can replace the reinforcing elements 13 of FIG. 1b, and the portions or elements 24 then replace the reinforcing elements 12. In such instances, the reinforcing elements or portions 23 cannot merge into the respective or adjacent reinforcing elements 24 because FIG. 1b shows that discrete reinforcing elements 13 are staggered with reference to pairs of reinforcing elements 12, as considered in the circumferential direction of the main section 2. However, if the portions 23 constitute the outer parts of the reinforcing elements 9 of FIG. 1a and the portions 24 constitute the inner parts of the elements 9, each portion 23 can merge directly into the registering portion 24. This is due to the fact that the lugs 4 of FIG. 1a are in radial alignment with the respective tongues 3.

Figure 5:
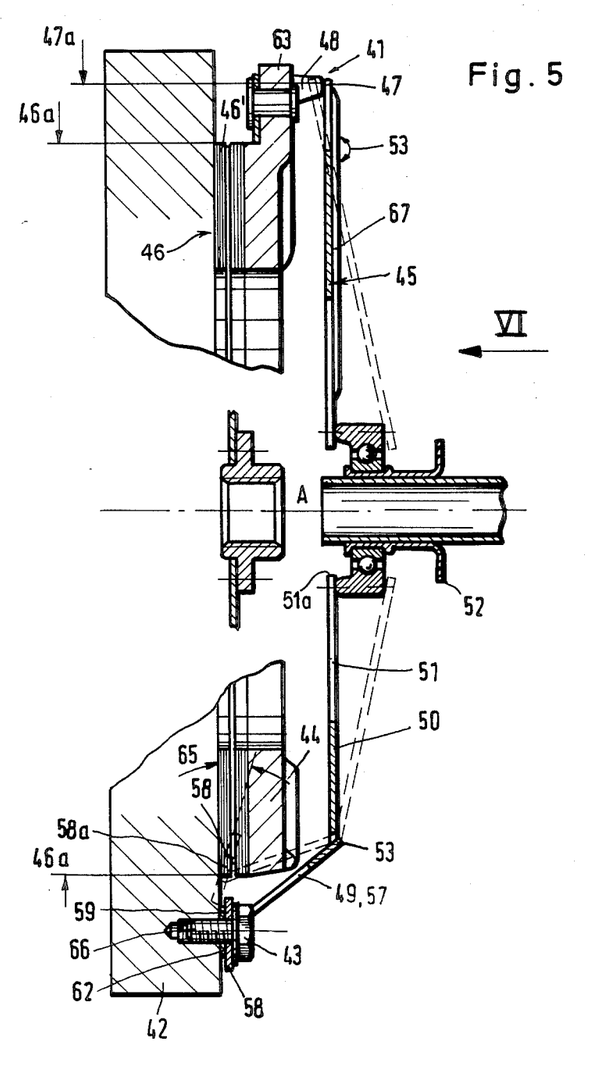
FIG. 5 is an axial sectional view of a friction clutch which embodies a sixth diaphragm spring having two sets of outwardly extending prongs and a set of inwardly extending prongs.
Figure 6:
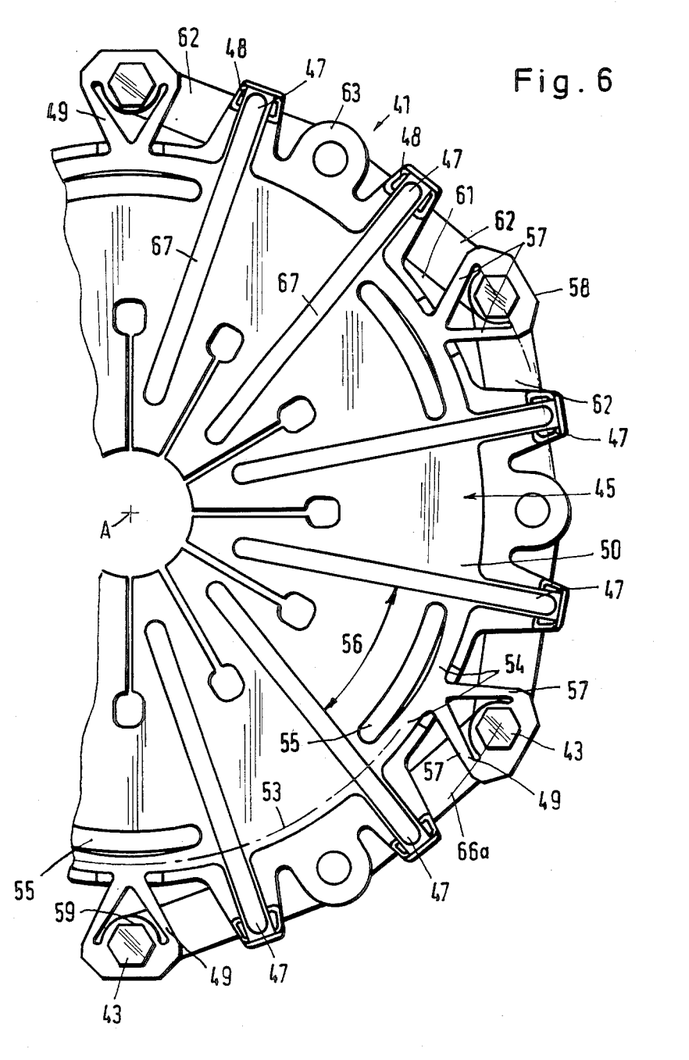
FIG. 6 is a fragmentary elevational view as seen in the direction of arrow VI in FIG. 5.

FIGS. 5 and 6 illustrate a structure which constitutes a friction clutch 41 and employs a diaphragm spring 45 resembling in certain respects the diaphragm spring 1 of FIG. 1a. The friction clutch 41 further comprises two coaxial components 42, 44 the former of which is a flywheel and the latter of which is a pressure plate 44 which is movable axially toward or away from the flywheel 42. A further component of the friction clutch 41 is constituted by a clutch disc 46 having an annular friction lining 46' which is clamped between the adjacent portions of the components 42, 44 when the diaphragm spring 45 is free to bias the component 44 axially toward the component 42. The component 42 is assumed to be driven by the crankshaft of an internal combustion engine, and the clutch disc 46 serves to transmit torque to the input shaft of a change-speed transmission in the motor vehicle embodying the internal combustion engine. The diaphragm spring 45 is detachably secured directly to the marginal portion of the component 42 by an annulus of discrete fasteners 43 in the form of bolts having shanks extending into tapped bores or holes 66 of the component 42. The diaphragm spring 45 comprises an annular main section 50, an annulus of prongs in the form of tongues 51 which extend inwardly from the innermost part of the main section 50, an annulus or group of prongs in the form of arms 49 extending outwardly from the outermost part of the main section 50, and an annulus or group of prongs in the form of lugs 47 which also extend outwardly from the outermost part of the main section 50. The arrangement is such that discrete arms 49 alternate with and are disposed midway between pairs of lugs 47, as considered in the circumferential direction of the main section 50. The marginal portion of the component 44 is formed with axially extending projections 48 and the lugs 47 of the diaphragm spring 45 bear against such projections to yieldably urge the component 44 toward the clutch disc 46 so that the friction lining 46' is clamped between the components 42, 44 and the component 42 can transmit torque to the clutch disc 46.

The free inner end portions or tips 51a of the tongues 51 can be moved in the axial direction of the friction clutch 41 by a disengaging device 52 in the form of a release bearing serving to move the tips 51a in the direction which is indicated by the arrow VI of FIG. 5 to thereby change the configuration of the diaphragm spring 45 and effect a movement of the lugs 47 axially and away from the component 42 with the result that the force with which the lugs 47 bear against the respective projections 48 is reduced and the component 42 ceases to transmit torque to the clutch disc 46. Depression of the tips 51a of the tongues 51 in the direction of the arrow VI entails a flexing of the diaphragm spring 45 in the region 53 which is indicated in FIG. 6 by a phantom-line circle and includes those connecting (innermost) portions 54 of the arms 49 which merge into the outermost part of the main section 50. As can be readily seen in FIG. 6, the region 53 of flexing of the diaphragm spring 45 in response to axial shifting of the tips 51a of tongues 51 is disposed radially inwardly of the lugs 47. Each tongue 51 and the corresponding (radially aligned) lug 47 can be said to constitute a two-armed lever whose fulcrum is located at 53 and whose arms move in the same direction when the lever is pivoted as a result of axial shifting of the tips 51a in the direction of arrow VI. With reference to the upper part of FIG. 5, the tongues 51 then pivot clockwise, the same as the respective lugs 47.

The arms 49 are rigid, as considered in the axial direction of the diaphragm spring 45, so that they can take up forces which develop during disengagement of the clutch when the tips 51a of the tongues 51 are moved in the direction of the arrow VI. As mentioned above, the connecting innermost portions 54 of the arms 49 are integral with the outermost part of the main section 50. The innermost portions 54 allow for a change in the conicity of that portion of the diaphragm spring 45 which includes the main section 50 and the lugs 47 when the diaphragm spring is to allow disengagement of the components 42, 44 from the respective sides of the friction lining 46' on the clutch disc 46. The main section 50 has arcuate slots 55 which extend in the circumferential direction of the diaphragm spring 45 and to both sides of the respective arms 49; this can be readily seen in FIG. 6. The slots 55 are inwardly adjacent to the innermost portions 54 of the respective arms 49 and each thereof extends (see the double-headed arrow 56 in FIG. 6) between the imaginary inward extensions of the lugs 47 which flank the respective arm 49. The innermost portions 54 form an annulus whose diameter is the same or substantially the same as that of the region 53 where the diaphragm spring 45 is flexed in response to the axial shifting of the tips 51a of the tongues 51. Each of the innermost portions 54 can be said to constitute or to perform the function of a torsion bar, and such innermost portions permit a flexing of the diaphragm spring for the purpose of disengaging the lugs 47 from the respective projections 48 or of returning the lugs 47 into engagement with the respective projections 48, depending upon whether the component 44 is to be free to move away from the friction lining 46' or is to be urged into frictional engagement with such lining.

FIG. 5 shows the diameter 47a of the circle which is defined by the points or areas of engagement between the lugs 47 and the respective projections 48 of the component 44. This diameter is greater than the diameter of the annular region 53.

Each arm 49 comprises two legs 57 which together constitute a substantially V-shaped body and diverge radially outwardly. The outer end portions of the two legs 57 are integral with an eyelet 58 which constitutes the outermost portion or outer end portion of the respective arm 49 and has an opening or hole 58a in register with the respective hole 66 of the component 42. The shanks of the fasteners 43 extend through the respective eyelets 58 and into the respective (registering) holes 66 when the diaphragm spring 45 is properly attached to the component 42. Each eyelet 58 has an extension 59 which extends toward the axis A of the clutch 41 radially inwardly beyond the outer end portions of the respective legs 57. FIG. 5 shows that, when the clutch 41 is fully assembled, the arms 49 of the diaphragm spring 45 extend axially along the periphery of the component 44 and along the periphery of the clutch disc 46 toward the respective side of the component 42. FIG. 5 also shows that the eyelets 58 of the arms 49 are disposed radially outwardly of the maximum diameter 46a of the annular friction lining 46' of the clutch disc 46. The projections 48 of the component 44 alternate with recesses 61 (as considered in the circumferential direction of the component 44), and each arm 49 extends through the respective recess 61 toward the component 42.

The friction clutch 41 further comprises coupling means for securing the component 44 to the diaphragm spring 45 so that the component 44 is movable axially of the component 42 but cannot rotate with respect thereto. The coupling means comprises a complete annulus of leaf springs 62 each of which is secured to one of radially outwardly extending protuberances 63 of the component 44 (e.g., by means of rivets) as well as to the eyelet 58 of the adjacent arm 49 of the diaphragm spring 45 or to a portion of the arm which is adjacent to the eyelet. Each protuberance 63 is disposed between two neighboring lugs 47. A discrete leaf spring 62 extends from the eyelet 58 of each arm 49 in a clockwise as well as in a counterclockwise direction, as viewed in FIG. 6. The other end of each leaf spring 62 is connected to the respective protuberance 63 of the component 44. In other words, each protuberance 63 is connected with two discrete leaf springs 62, and each eyelet 58 is also connected with two discrete leaf springs 62.

Figure 7:
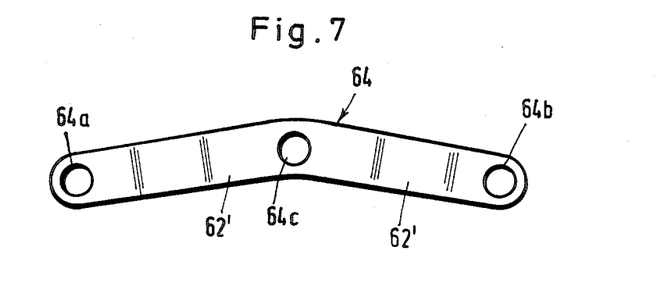
FIG. 7 illustrates a two-armed leaf spring which can be used as an element of a coupling device in the friction clutch of FIGS. 5 and 6.

FIG. 7 shows a modified (two-armed) leaf spring 64 which replaces two leaf springs 62 and has two arms 62' extending to the opposite sides of a median portion having a hole 64c. The free ends of the two arms 62' are provided with holes 64a and 64b for reception of bolts, screws or other types of securing means serving to connect the leaf spring 64 to an eyelet 58 (hole 64c) and to a pair of protuberances 63 (holes 64a, 64b). It is equally possible to connect the median portion (hole 64c) of each two-armed leaf spring 64 to a protuberance 63 and to connect the two arms 62' (holes 64a, 64b) to a pair of discrete eyelets 58. The median portion of each leaf spring 64 can be made integral with an eyelet 58 so that the hole 64c can be omitted. For example, the median portion of such leaf spring can be welded to the respective eyelet 58. It is also possible to make each eyelet 58 or another portion of each arm 49 integral with two discrete leaf springs 62 of the type shown in FIGS. 5 and 6. The provision of integral connections between the leaf springs 62 or 64 and the arms 49 of the diaphragm spring 45 simplifies the assembly of the clutch. Thus, the free ends of the leaf springs 62 or 64 are simply riveted to the protuberances 63 of the component 44 and the subassembly including the diaphragm spring 45 and component 44 is ready to be secured to the component 42. Such design of the diaphragm spring contributes to a substantial reduction of the initial cost of the friction clutch.

The feature that the leaf springs 62 or the arms 62' of the leaf springs 64 extend from opposite sides of the arms 49 (i.e., clockwise and counterclockwise, as considered in the circumferential direction of the main section 50) is especially desirable and advantageous in friction clutches of the type wherein the components can or should rotate in a clockwise or in a counterclockwise direction. Such mounting of the leaf springs ensures that the transfer of torque between the diaphragm spring 45 and the component 44 is unaffected by the direction of rotation of these parts. The feature that each arm 49 is secured to or connected with two leaf springs 62 or with a two-armed leaf spring 64 brings about the advantage that the number of fasteners which secure the leaf springs to the diaphragm spring 45 need not exceed the number of arms 49. This, in turn, reduces the cost of assembling the clutch irrespective of whether the assembly takes place in an automatic machine or partially by hand.

FIG. 5 indicates by broken lines the position of the diaphragm spring 45 prior to attachment to the component 44 (by means of leaf springs 62) and prior to attachment to the component 42 (by discrete fasteners 43). It will be noted that the eyelets 58 and the adjacent surface of the component (flywheel) 42 then make a small acute angle 65 and that such angle is reduced to zero when the conicity of the hollow conical frustum formed by the arms 49 with reference to the conicity of the hollow conical frustum formed by the main section 50 and lugs 47 is increased as a result of attachment of the diaphragm spring 45 to the component 44 so that the holes 58a of the eyelets 58 register with the respective holes 66 of the component 44. In other words, the eyelets 58 are caused to move radially outwardly when the leaf springs 62 properly secure the diaphragm spring 45 to the component 44. The parts 45, 44 and 62 can be assembled into a prefabricated unit which is thereupon connected to the component 42 by a set of fasteners 43. Assembly of parts 44, 45 and 62 into a prefabricated unit automatically results in placing of the centers of openings 58a onto a circle 66a whose diameter is the same as that of the axes of holes 66 in the component 42 so that the diaphragm spring 45 need not undergo additional deformation in order to allow for insertion of fasteners 43 into the holes 58a of the eyelets 58 as well as into the registering holes 66. At the very least, the leaf springs 62 can position all of the arms 49 at such a distance from the axis A that the centers of the openings 58a are at least substantially in register with the holes 66 when the just discussed prefabricated or preassembled unit is to be secured to the component 42. The properly attached leaf springs 62 cause the eyelets 58 of the arms 49 to move radially outwardly so that the arms 49 are maintained under an initial stress prior to securing of their eyelets 58 to the component 42. The leaf springs 62 are then subjected to longitudinal compressive stresses because the eyelets 58 exhibit the tendency to move radially inwardly. With reference to the lower portion of FIG. 5, the eyelet 58 which is shown by solid lines is held (by the respective leaf springs 62) against movement toward the broken-line position. The properly installed leaf springs 62 are prestressed, as considered in the axial direction of the clutch 41, so that they move the component 44 axially and away from the component 42 as soon as permitted to do so by the lugs 47, i.e., as soon as the tips 51a of the tongues 51 are shifted in the direction of arrow VI in response to axial movement of the disengaging means 52. The thus prestressed leaf springs 62 ensure that the projections 48 of the component 44 remain in constant engagement with the respective lugs 47 irrespective of the axial position of the disengaging means 52.

The assembly of diaphragm spring 45 with the component 44 and leaf spring 62 into a prefabricated unit which can be readily attached to or disconnected from the component 42 exhibits the aforediscussed advantages as well as the additional advantage that, at least at the operating point of the diaphragm spring, the latter is not subjected to pronounced additional bending and/or torsional stresses in the region where the tongues 51 merge into the main section 50.

The diaphragm spring 45 is also provided or can be provided with reinforcing elements in the form of elongated straight radial ribs 67 each of which extends toward but short of the tip 51a of the respective tongue 51 as well as toward but short of the tip of the aligned lug 47. It will be noted that each reinforcing element 67 extends radially across the entire main section 50 analogously to the reinforcing elements 9 of the diaphragm spring 1 shown in FIG. 1a. These reinforcing elements ensure an optimum transfer of forces (which develop in response to axial shifting of the tips 51a of the tongues 51 by the disengaging means 52) into the main section 50 as well as an optimum transfer of stored energy from the main section 50 into the lugs 47 of the diaphragm spring 45. None of the reinforcing elements 67 extend all the way to the outermost edge face or to the innermost edge face of the diaphragm spring 45.

FIG. 5 shows that the reinforcing elements 67 extend from the right-hand major surface of the diaphragm spring 45 so that they do not interfere with proper contact between the lugs 47 and the respective projections 48. If desired, the reinforcing elements 67 can be shortened so that their outer ends terminate radially inwardly of the locations of contact between the lugs 47 and the respective projections 48. This is often advisable because it results in a larger-area contact between the parts 47 and 48. Such large-area contact is desirable and advantageous because it entails lesser wear upon the lugs 47 and/or projections 48.

Additional reinforcing elements are or can be provided on the arms 49 to ensure that the arms cannot yield in the axial direction of the diaphragm spring 45. Such reinforcing elements can be provided on each of the legs 57 and can constitute ribs which are formed by upsetting, bending, stamping or by resort to another suitable technique.

The provision of slots 55 contributes to elasticity of the diaphragm spring 45 in the region 53 (of the connecting portions 54) where the conical frustum including the main section 50, tongues 51 and lugs 47 is flexed relative to the concial frustum including the arms 49 when the disengaging means 52 is moved axially to engage and displace the tips 51a of the tongues 51. Pronounced elasticity of the diaphragm spring 45 is desirable because it contributes to longer useful life of the diaphragm spring. The provision of slots 55 enables the connecting portions 54 to act not unlike torsion bars when the tips 51a of the tongues 51 are shifted by the disengaging means 52. It has been found that the making of relatively long slots 55 (as considered in the circumferential direction of the main section 50) enhances the flexibility of the connecting portions 54. As stated above, the slots 55 can extend all the way between the neighboring pairs of radially extending reinforcing elements 67 for the tongues 51 and main section 50.

The conicity of the frustum including the arms 49 invariably exceeds the conicity of the frustum which includes the main section 50, tongues 51 and lugs 47 irrespective of whether or not the arms 49 are prestressed by the leaf springs 62 and irrespective of whether or not the arms 49 are secured to the component 42. Widening of the arms 49 adjacent to the region 53 and also radially inwardly adjacent to the eyelets 58 is desirable and advantageous because this ensures that the arms can offer maximum moments of resistance where they are most likely to undergo maximum stressing, particularly by flexing. Maximum stressing is likely to uccur at 53 and again inwardly adjacent to the eyelets 58.

It will be readily appreciated that the improved diaphragm spring can be put to many uses other than in a friction clutch. However, such diaphragm spring can be used with particular advantage in a friction clutch for motor vehicles or the like, e.g., in a manner as shown in FIGS. 5 and 6 where the diaphragm spring 45 replaces a conventional diaphragm spring as well as the cover of a conventional clutch. The diaphragm spring 45 is connected to one of the two components 42, 44 and biases the other component toward the one component and into frictional engagement with the clutch disc 46 between the two components. The advantages of the improved diaphragm spring and of a clutch which embodies such spring will be readily appreciated by comparing the friction clutch 41 of FIGS. 5 and 6 with a conventional friction clutch, e.g., a clutch of the type described and shown in German Pat. No. 756,351 wherein the diaphragm spring is confined between a cover and the adjacent pressure plate. Furthermore, the improved diaphragm spring also replaces the customary seats (e.g., wire rings or the like) which are provided on the cover of a conventional friction clutch for the main portion of the diaphragm spring. The omission of such seats renders it possible to omit bolts, rivets or other fasteners which are used in conventional friction clutches to secure the seats to the cover and to maintain the main section of the diaphragm spring in an optimum position between the two seats. In other words, the feature that the improved diaphragm spring can replace a conventional diaphragm spring as well as the cover of a conventional friction clutch renders it possible to eliminate a substantial number of additional parts which are essential constituents of a conventional clutch. This greatly reduces the initial and assembly cost of a friction clutch which embodies the improved diaphragm spring. Moreover, the omission of a cover, of seats and fasteners for the seats enables the friction clutch, which employs the improved diaphragm spring, to operate in a manner which is superior to that of conventional friction clutches. For example, the weight of the friction clutch wherein the diaphragm spring obviates the need for a discrete cover is but a fraction of the weight of a conventional friction clutch. Also, the axial length of such friction clutch is but a fraction of the axial length of a conventional friction clutch. These features (reduction of weight and reduction of axial length) are especially important in many recently developed and popularized types of motor vehicles because the designers of such vehicles are interested in reducing the overall weight and dimensions of the vehciles. An additional important advantage of a friction clutch wherein the diaphragm spring replaces, or obviates the need for, a cover is that cooling of the clutch is simpler and less expensive than the cooling of a conventional clutch with cover and seats for the main section of the diaphragm spring. The diaphragm spring which is not concealed under a cover can stand more pronounced thermal stresses and it allows for more rapid, less expensive and simpler cooling of all other parts of the friction clutch. This is due to the fact that the stream or streams of cooling air which are resorted to in order to cool the components of the clutch are not interfered with by the cover which is normally a relatively heavy, bulky and expensive constituent of a conventional friction clutch. Satisfactory cooling renders it possible to subject the pressure plate or plates of the clutch, as well as the friction disc or discs, to more pronounced thermal stresses.

An additional important advantage of a friction clutch which embodies the improved diaphragm spring (as a substitute for a conventional diaphragm spring and a customary cover) is that the wear upon the diaphragm spring is a relatively small fraction of that in a conventional clutch wherein the diaphragm spring must be mounted between two seats which are carried by the cover. The wear upon the seats is also eliminated since the seats are omitted in their entirety. The wear upon a conventional diaphragm spring in the region of the seats therefor necessitates a gradual increase of the extent of axial movement of the release bearing in order to disengage the clutch. Moreover, a clutch which embodies the improved diaphragm spring can operate without the unavoidable play between a conventional diaphragm spring and the release bearing. This is due to the fact that a clutch which embodies the improved diaphragm spring, and wherein the diaphragm spring replaces a conventional diaphragm spring as well as the cover, need not be provided with any seats for the diaphragm spring because the diaphragm spring can be said to carry or embody its own seats. Thus, instead of rolling and/or flexing between two seats on the cover, the diaphragm spring which is constructed and mounted in a manner as shown in FIGS. 5 and 6 performs the function of a two-armed lever as a result of elastic deformation of the connecting portions 54.

The feature that the eyelets 58 of the arms 49 are secured to the component 42 of the friction clutch 41 radially outwardly of the outermost portion of the friction lining 46' is desirable and advantageous because the holes 66 and the fasteners 43 are readily accessible for attachment of the unit including the parts 45, 44 and 62 to the component 42 or for convenient removal of such unit from the component 42.

The provision of reinforcing elements 67 on the tongues 51 ensures that the disengaging means 52 must be moved through a short distance (in the direction of arrow VI in FIG. 5) in order to disengage the friction clutch 41. The reinforcing elements 67 counteract the tendency of the tongues 51 to flex in response to the application of axial forces to their tips 51a. Therefore, flexing in the region 53 takes place in response to relatively short axial displacement of the disengaging means 52. The feature that the reinforcing elements 67 extend into the main section 50 also contributes to more rapid disengagement of the friction clutch 41 in response to axial movement of the disengaging means 52 in the direction of arrow VI. Moreover, and as explained hereinbefore, the feature that the reinforcing elements 67 extend into the main section 50 ensures more uniform distribution of stresses in the circumferential direction of the main section. The additional feature that the reinforcing elements 67 extend all the way across the main section 50 and into the lugs 47 ensures that the distribution of stresses can take place in each and every part of the main section 50 as well as that the lugs 47 also exhibit a pronounced resistance to flexing and bear, with a predictable force, against the respective projecctions 48 to thus ensure the establishment of satisfactory frictional engagement between the lining 46' and the components 42, 44. In other words, the reinforced lugs 47 are more likely to transmit stored energy from the diaphragm spring 45 to the component 44 with a high degree of predictability and reproducibility.

Figure 8:
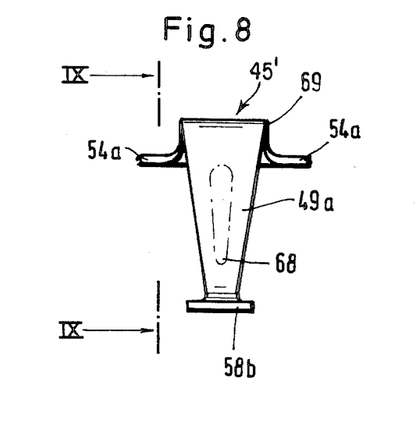
FIG. 8 is an end elevational view of a portion of a further diaphragm spring having prongs in the form of arms which taper outwardly and away from the outermost part of the main section.
Figure 9:
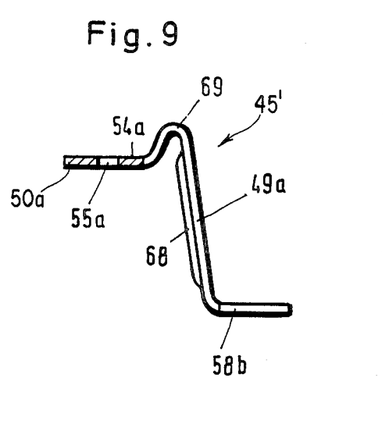
FIG. 9 is a sectional view as seen in the direction of arrows from the line IX—IX of FIG. 8.

FIGS. 8 and 9 illustrate a portion of a further diaphragm spring 45' which can be used in lieu of the diaphragm spring 45 and comprises undulate or similarly looped arms 49a. The innermost portions 54a of such arms merge into the main section 50a of the diaphragm spring 45' and are disposed radially outwardly of arcuate slots 55a corresponding to the slots 55 of the main section 50. As can be readily seen in FIG. 8, each arm 49a tapers radially outwardly and axially of the main section 50a and has an eyelet 58b. Furthermore, each arm 49a comprises a looped intermediate portion 69 which is radially outwardly adjacent to the respective innermost portion 54a and extends axially of the diaphragm spring 45' in a direction counter to that of the radial reinforcing element 68 and eyelet 58. The purpose of the elements 68 is to reinforce the respective arms 49a. The intermediate portions 69 also contribute to reinforcement of the respective arms 49a.

The mode of operation of a friction clutch which embodies the diaphragm spring 45' in lieu of the diaphragm spring 45 of FIGS. 5 and 6 is the same or nearly the same as that of the clutch 41. Thus, the clutch is normally engaged because the lugs 47 (not shown in FIGS. 8 and 9) of the prestressed diaphragm spring 45' bear against the respective projections 48 and bias the component 44 toward the component 42 so that the clutch disc 46 can receive torque from the components 42, 44 or vice versa. If the clutch is to be disengaged, the disengaging means 52 shifts the tips 51a of the tongues 51 (not shown in FIGS. 8 and 9) in the axial direction of the clutch so that the diaphragm spring 45' is deformed in the region of the innermost portions 54a whereby such innermost portions 54a of the arms 49a act not unlike torsion bars and the lugs 47 (not shown in FIGS. 8 and 9) move axially of and away from the component 42 to relax the pressure upon the component 44 which follows the movement of the respective lugs 47 under the action of the axially prestressed leaf springs 62 or 64. The arms 49a are sufficiently stiff (as considered in the axial direction of the friction clutch) that they can resist the disengaging forces and thereby undergo no deformation at all or a bare maximum of deformation. In other words, the working capacity of the innermost end portions 54a of the arms 49a prevails, the same as in the clutch 41 of FIGS. 5 and 6.

If the diaphragm spring of the present invention is not provided with arms 49 or equivalent means for facilitating its attachment to a component of a friction clutch, the clutch can be equipped with mechanical or hydraulic means for urging the diaphragm spring against one of the components in order to urge such component axially toward the other component and into requisite frictional engagement with a clutch disc between the two components.

An additional important advantage of the improved friction clutch is that the annular flexing zone or region 53 of its diaphragm spring 45 is unsupported, i.e., it need not be provided between a pair of seats as in heretofore known friction clutches. In other words, neither side of the diaphragm spring 45 in the region of the flexing zone 53 must be in contact with any other parts of the friction clutch. It can be said that the flexing zone 53 "floats" somewhere radailly inwardly of the lugs 47 and radially outwardly of the tongues 51 and enables each lug 47 to cooperate with one or more tongues 51 not unlike a two-armed lever which is fulcrumed at 53 and is pivoted in response to axial shifting of the disengaging device 52 in order to move the tongues 51 and the lugs 47 in the same direction, i.e., clockwise, as viewed in FIG. 5, in response to axial shifting of the disengaging device 52 in the direction of arrow VI. This entails a movement of the lugs 47 away from the flywheel 42 with attendant relaxation of pressure upon the linings 46' of the clutch disc 46 so that the flywheel can rotate relative to such clutch disc and/or vice versa. The conical frustum including the main section 50, the tongues 51 and the lugs 47 then changes it conicity relative to the conical frustum which is formed by the retaining portion including the annulus of arms 49.

The reinforcing elements 67 enhance the stiffness of tongues 51 and of the registering lugs 47. The arms 49 may also be reinforced (if necessary) so that they are rigid as considered in the axial direction of the friction clutch 41 to counteract the disengaging forces which are applied by the device 52 via tongues 51. On the other hand, such axially stiff arms 49 do not interfere with flexing of the diaphragm spring in the region of the torsion zone 53, i.e., in the region of the annulus of intermediate portions 54.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A diaphragm spring having radially innermost and outermost edge faces and comprising an annular main section having an innermost and an outermost part; a first and a second group of prongs extending outwardly from said outermost part, m prongs of said first group alternating with n prongs of said second group, as considered in the circumferential direction of said main section, m and n being whole numbers including one; and reinforcing elements provided on at least some of said prongs and extending into said main section across at least one of said parts but terminating short of at least one of said edge faces.

2. The diaphragm spring of claim 1, wherein each of said prongs has a free end portion and said reinforcing elements terminate short of the respective free end portions.

3. The diaphragm spring of claim 2, further comprising additional prongs which extend inwardly from said innermost part.

4. The diaphragm spring of claim 1, wherein said main section constitutes or forms part of a first hollow conical frustum and the prongs of one of said groups together constitute or form part of a second hollow conical frustum whose conicity is more pronounced than that of said first conical frustum.

5. The diaphragm spring of claim 1, wherein each of said reinforcing elements extends toward but short of the innermost part of said main section.

6. The diaphragm spring of claim 1, further comprising additional prongs extending inwardly from said innermost part, each of said prongs having a free end portion and each of said reinforcing elements extending substantially radially across the entire main section toward but short of the free end portion of one of said additional prongs as well as toward but short of the free end portion of one prong of said plurality of prongs.

7. The diaphragm spring of claim 1, wherein the thickness of at least a portion of each of said reinforcing elements, as considered in the axial direction of the spring, is less than the thickness of the non-reinforced portions of the spring.

8. The diaphragm spring of claim 1, wherein said reinforcing elements are corrugations of said main section and said prongs and the height of such corrugations, as considered axially of the diaphragm spring, varies in the radial direction of said main section.

9. The diaphragm spring of claim 1 with two main surfaces, wherein each of said reinforcing elements extends from one or the other main surface of the diaphragm spring and the extent to which at least some of said reinforcing elements project beyond the respective main surface or surfaces decreases in a direction radially outwardly of said main section.

10. The diaphragm spring of claim 9, wherein each of said at least some reinforcing elements has an outer end portion which merges gradually into said main section.

11. The diaphragm spring of claim 1 with first and second major surfaces, wherein at least some of said reinforcing elements have first portions extending axially of the spring from one of said major surfaces and second portions extending axially of the spring from the other of said major surfaces.

12. The diaphragm spring of claim 1 having first and second major surfaces, wherein said reinforcing elements include at least one first reinforcing element extending from one of said major surfaces and at least one second reinforcing element extending from the other of said major surfaces.

13. The diaphragm spring of claim 1, wherein said prongs include arms and said reinforcing elements include ribs on said arms.

14. The diaphragm spring of claim 13, wherein said ribs constitute deformed integral portions of the respective arms.

15. The diaphram spring of claim 1, wherein said prongs include arms having free end portions constituting eyelets which facilitate attachment of said arms to a support.

16. The diaphragm spring of claim 1, wherein said prongs include arms and having a substantially constant width, as considered in the circumferential direction of said main section.

17. The diaphragm spring of claim 1, wherein said prongs include arms tapering outwardly from the outermost part of said main section.

18. The diaphragm spring of claim 1, wherein said prongs include arms and, each of said arms includes a first portion which is integral with said main section and a second portion which is disposed radially outwardly of the respective first portion, the width of said first portions exceeding the width of the respective second portions, as considered in the circumferential direction of said main section.

19. A diaphragm spring having radially innermost and outermost edge faces and comprising an annular main section having an innermost and an outermost part; a plurality of prongs extending from said outermost part, said prongs including arms and said main section having slots inwardly adjacent to said arms; and reinforcing elements provided on at least some of said prongs, said reinforcing elements being integral with the respective prongs and extending into said main section across at least one of said parts.

20. The diaphragm spring of claim 19, wherein said main section further comprises connecting portions outwardly adjacent to said slots and integral with the respective arms.

21. The diaphragm spring of claim 19, wherein said slots extend in the circumferential direction of said main section.

22. The diaphragm spring of claim 1, wherein said reinforcing elements constitute corrugatio-s which are integral with the respective prongs.

23. A diaphragm spring having radially innermost and outermost edge faces and comprising an annular main section having an innermost and an outermost part; a first and a second group of prongs extending outwardly from said outermost part, discrete prongs of said first group alternating with pairs of prongs of said second group, as considered in the circumferential direction of said main section; and reinforcing elements provided on at least some of said prongs and extending into said main section across at least one of said parts but terminating short of at least one of said edge faces.

24. A diaphragm spring having radially innermost and outermost edge faces and comprising an annular main section having an innermost and an outermost part; a plurality of prongs extending from at least one of said parts, said prongs including arms extending from said outermost part; at least one additional prong between each pair of arms, as considered in the circumferential direction of said main section, each of said additional prongs having a free end portion and said arms merging into said main section radially inwardly of the free end portions of the neighboring additional prongs; and reinforcing elements provided on at least some of said prongs and extending into said main section across at least one of said parts but terminating short of at least one of said edge faces.

25. A diaphragm spring having radially innermost and outermost edge faces and comprising an annular main section having an innermost and an outermost part; a plurality of prongs extending from at least one of said parts, said prongs including at least one group of prongs extending outwardly from the outermost part of and merging into said main section, said main section constituting or forming part of a first hollow conical frustum and said group of prongs constituting or forming part of a second hollow conical frustum, the conicity of said conical frusta being different and at least one of said conical frusta being flexible with reference to the other of said conical frusta in the regions of merger of the prongs of said group into said main section; and reinforcing elements provided on at least some of said prongs and extending into said main section across at least one of said parts but terminating short of at least one of said edge faces.

26. A diaphragm spring having radially innermost and outermost edge faces and comprising an annular main section having an innermost and an outermost part; a plurality of prongs including arms extending outwardly from said outermost part, said main section having slots inwardly adjacent to said arms and connecting portions outwardly adjacent to said slots and integral with the respective arms, said connecting portions constituting torsion bars which allow for flexing of said arms with reference to said main section and/or vice versa; and reinforcing elements provided on at least some of said prongs and extending into said main section across at least one of said parts but terminating short of at least one of said edge faces.

27. A diaphragm spring having radially innermost and outermost edge faces and comprising an annular main section having an innermost and an outermost part; a plurality of prongs including arms extending outwardly from said outermost part and lugs extending outwardly from said outermost part and alternating with said arms, as considered in the circumferential direction of said main section, each of said arms being flanked by a pair of lugs and said main section having slots inwardly adjacent to said arms, said slots being disposed radially inwardly of and extending between the respective pairs of lugs, as considered in the circumferential direction of said main section; and reinforcing elements provided on at least some of said prongs and extending into said main section across at least one of said parts but terminating short of at least one of said edge faces.

28. A diaphragm spring having radially innermost and outermost edge faces and comprising an annular main section having an innermost and an outermost part; a plurality of prongs including arms extending outwardly from said outermost part and lugs extending outwardly from said outermost part and alternating with said arms, as considered in the circumferential direction of said main section, each of said arms being flanked by a pair of lugs and said main section having slots inwardly adjacent to said arms, said slots extending in the circumferential direction of said main section and extending beyond the respective arms, as considered in the circumferential direction of said main section, between the imaginary extensions of the respective pairs of lugs toward the axis of said main section; and reinforcing elements provided on at least some of said prongs and extending into said main section across at least one of said parts but terminating short of at least one of said edge faces.

29. The diaphragm spring of claim 28, wherein said reinforcing elements include ribs provided on said lugs and extending across said main section, each of said slots being flanked by the ribs of the respective pair of lugs.

30. A diaphragm spring having radially innermost and outermost edge faces and comprising an annular main section having an innermost and an outermost part; a plurality of prongs including an annulus of tongues extending inwardly from said innermost part and constituting with said main section at least a portion of a first hollow conical frustum, said prongs further including lugs and arms extending outwardly from said outermost part and said arms constituting or forming part of a second hollow conical frustum whose conicity exceeds that of said first conical frustum; and reinforcing elements provided on at least some of said prongs and extending into said main section across at least one of said parts but terminating short of at least one of said edge faces.

31. A diaphragm spring having radially innermost and outermost edge faces and comprising an annular main section having an innermost and an outermost part; a plurality of prongs including arms extending outwardly from said outermost part and having inner ends which are flexible relative to and integral with said main section, said arms including first and second portions which are respectively subject to greater and lesser bending stresses when the spring is installed in a friction clutch or the like, said first portion of each of said arms having a first moment of resistance and said second portion of each arm having a lesser second moment of resistance; and reinforcing elements provided on at least some of said prongs and extending into said main section across at least one of said parts but terminating short of at least one of said edge faces.

32. A diaphragm spring having first and second major surfaces and radially innermost and outermost edge faces and comprising an annular main section having an innermost and an outermost part; a plurality of prongs extending from said outermost part; and reinforcing elements provided on at least some of said prongs, said reinforcing elements being integral with the respective prongs and extending into said main section across at least one of said parts, said reinforcing elements including at least one first reinforcing element extending from one of said major surfaces and at least one second reinforcing element extending from the other of said major surfaces, said first reinforcing element merging into said second reinforcing element.

33. A diaphragm spring having radially innermost and outermost edge faces and comprising an annular main section having an innermost and an outermost part; a plurality of prongs extending from said outermost part; and reinforcing elements provided on at least some of said prongs, said reinforcing elements being integral with the respective prongs and extending into said main section across at least one of said parts, each of said reinforcing elements having a first end portion nearer to said outermost edge face and a second end portion nearer to said innermost edge face, said spring further having a hole at one end portion of at least one of said reinforcing elements.

* * * * *